(12) United States Patent
Deeken et al.

(10) Patent No.: US 8,312,716 B2
(45) Date of Patent: Nov. 20, 2012

(54) HYDRAULIC DRIVE SYSTEM

(75) Inventors: Michael Deeken, La Tour-de-Trême (CH); Volker Gliniorz, Echarlens (CH)

(73) Assignee: Liebherr-Machines Bulle SA, Bulle (CH)

( * ) Notice: Subject to any disclaimer, the term of this patent is extended or adjusted under 35 U.S.C. 154(b) by 609 days.

(21) Appl. No.: 12/288,182

(22) Filed: Oct. 17, 2008

(65) Prior Publication Data
US 2009/0145122 A1  Jun. 11, 2009

(30) Foreign Application Priority Data
Oct. 19, 2007  (DE) .................... 20 2007 014 676 U

(51) Int. Cl.
*F16D 31/02* (2006.01)
(52) U.S. Cl. ................. 60/490; 60/414; 60/416
(58) Field of Classification Search .......... 60/413, 60/414, 416, 451, 452, 490, 491, 448
See application file for complete search history.

(56) References Cited

U.S. PATENT DOCUMENTS 5,070,695 A * 12/1991 Metzner ................... 60/448
5,341,311 A * 8/1994 Liebler ..................... 60/452
5,561,979 A * 10/1996 Coutant et al. ............ 60/448

FOREIGN PATENT DOCUMENTS

| DE | 973010 | 7/1949 |
|---|---|---|
| DE | 2739968 | 3/1979 |
| DE | 0065304 | 5/1982 |
| DE | 3404190 | 8/1985 |
| DE | 3623264 | 8/1987 |
| DE | 3729495 | 3/1989 |
| DE | 4001690 | 8/1990 |
| DE | 4111500 | 10/1992 |
| DE | 4327313 | 2/1995 |
| DE | 10033803 | 1/2002 |

OTHER PUBLICATIONS

EPO Search Report dated Jun. 28, 2011 including "X", "Y" or "A" indication.

* cited by examiner

*Primary Examiner* — Michael Leslie
(74) *Attorney, Agent, or Firm* — Dilworth & Barrese, LLP.

(57) ABSTRACT

The present invention relates to a hydraulic drive system having a pressure-regulated hydraulic pump for the provision of a system pressure and having a secondarily regulated hydraulic motor. In accordance with the invention, a control is provided which sets the desired system pressure during operation in dependence on an operating parameter of the hydraulic motor.

19 Claims, 2 Drawing Sheets

HYDRAULIC DRIVE SYSTEM

BACKGROUND OF THE INVENTION

The present invention relates to a hydraulic drive system having a pressure-regulated hydraulic pump for the provision of a system pressure and having a secondarily regulated hydraulic motor.

In such secondarily regulated hydraulic drive systems, the hydraulic pump which is made as a variable delivery pump provides, with the help of a pressure regulation, a system pressure in the line network which is applied to the hydraulic motor. The hydraulic motor which is made as a variable capacity motor then drives a consumer with speed regulation, torque regulation and/or rotational angle regulation. Such a secondarily regulated hydraulic drive system thus includes a pressure-regulated variable delivery pump as a primary unit and a variable capacity motor with speed regulation, torque regulation and/or rotational angle regulation as a secondary unit. A mechanical transmission can be connected before such a hydraulic drive system and connects a drive unit such as an internal combustion engine to the hydraulic pump.

The following designs of the components usually result for a secondarily regulated hydraulic drive system:

- Axial piston units in swash plate construction are usually used for the setting up of a simple secondarily regulated propulsion drive, with any other adjustable hydraulic displacement machines, however, also being able to be used for the hydraulic motor and the hydraulic pump.
- The hydraulic pump must be able to be adjusted from 0 to a maximum pumping volume.
- The hydraulic motor must be able to be adjusted from a maximum negative displacement volume to a maximum positive displacement volume if the apparatus should be both accelerated and decelerated with the help of the hydraulic drive system. The hydraulic motor must therefore be adjustable from 0 both to a maximum negative displacement or pumping volume to a maximum positive displacement or pumping volume.
- The pressure-regulated hydraulic pump pumps exactly the oil volume flow into the line network which is required to maintain the system pressure in the line network at a desired system pressure. In this connection, with known secondarily regulated hydraulic drive systems, the system pressure is independent of the oil volume flow removal by the hydraulic motor.
- The output torque of the hydraulic motor, which is usually in axial piston construction, is in proportional relation to the set displacement volume and to the applied supply pressure which is provided as the system pressure by the hydraulic pump. The speed regulation of the hydraulic motor then regulates the displacement volume of the hydraulic motor exactly so that its output torque accelerates or decelerates the drivetrain of the apparatus to be driven to the speed desired by the operator or maintains it at the speed. Depending on the displacement volume set, the hydraulic motor removes the required volume flow from the line network. If the speed setting of the operator requires a deceleration of the drivetrain, the hydraulic motor changes its displacement direction and works in pump operation so that it pumps oil volume into the line network and thus brakes the apparatus connected to the hydraulic motor. Equally, in addition to such a speed regulation, a torque regulation or rotational angle regulation of the hydraulic motor is also conceivable.

Advantageously, in this respect, a high pressure store which can store hydraulic energy temporarily is provided in the hydraulic circuit of hydraulic pump and hydraulic motor. If the system pressure increases, for example in that the hydraulic motor works in pump operation, the high pressure store receives oil volume and can then return it to the line network at a later time. With secondarily regulated hydraulic drive systems, a substantial energy saving can hereby be realized with respect to primarily regulated hydraulic drive systems.

Such secondarily regulated hydraulic drive systems can be used e.g. as a hydrostatic transmission in a propulsion drive of a vehicle, for example for earth-moving machinery. Hydraulic drive systems, in particular hydrostatic propulsion drives, usually have to be able to cover a wide performance range, that is, the drive must satisfy both small performance demands (low speeds and accelerations at low drive torques) and large performance demands (high speeds and accelerations at high drive torques) within preset performance limits.

With hydrostatic propulsion drives, for example, the drive for a typical output cycle requires a high output torque during the start-up phase to accelerate the vehicle, e.g. an earth-moving machine, to the desired speed. The propulsion drive during travel at the reached speed, in contrast, still only requires a low output torque to maintain the machine at the speed. Similar load cycles also result with a plurality of other usage possibilities of hydraulic drive systems.

Since the output torque of a secondarily regulated hydraulic motor is dependent on the product of its displacement volume and the supply pressure, the maximum possible displacement volume of the hydraulic motor as well as the supply pressure must be designed for the maximum load on the drive system. Accordingly, during working phases with lower performance demands, the displacement volume of the hydraulic motor must be reduced by regulation.

Adjustable hydraulic displacement machines, in particular axial piston units, however, in principle have high losses at working points with small displacement volumes and high operating pressures. If the performance demand on the hydraulic drive system is low as is e.g. the case with smooth driving at low speed and low tractive force or when the vehicle is stationary, both displacement units work at precisely such working points, however, in conventional secondarily regulated hydraulic drive systems. Both the pressure regulated hydraulic pump and the secondarily regulated, e.g. speed regulated, hydraulic motor continue to work with the system pressure also provided for maximum performance demands and accordingly with small pumping or displacement volumes at these low performance demands. Both high energy losses, and thus a low total efficiency, and a high load of all components hereby result.

SUMMARY OF THE INVENTION

It is therefore the object of the present invention to further develop a secondarily regulated hydraulic drive system to increase the total efficiency and to reduce the load on the components. This should advantageously be made possible with a system which is as simple and as cost-effective as possible.

This object is solved in accordance with the invention by a hydraulic drive system in accordance with the description herein. This hydraulic drive system has a pressure regulated hydraulic pump for the provision of a system pressure and a secondarily regulated hydraulic motor, wherein a control is furthermore provided which sets the desired system pressure during operation in dependence on an operating parameter of the hydraulic motor. The control in accordance with the invention responds to the change of the operating parameter of the hydraulic motor, and thus to different demands on the hydraulic drive system, by a change in the desired system pressure which is preset for the pressure regulation of the hydraulic pump. The problem which exists with known secondarily regulated hydraulic drive systems that the desired system pressure has to be orientated on the maximum power output of the drive system and always remains constantly high during operation without this being necessary for the then current power output of the hydraulic motor as well as the disadvantages associated with this and described above can hereby be avoided.

In accordance with the invention, the control sets the desired system pressure in dependence on the performance demands and/or torque demands on the secondarily regulated hydraulic motor. The control in accordance with the invention can hereby set a high desired system pressure which is provided by the pressure regulated hydraulic pump at high loads on the hydraulic motor to provide the large output torques of the hydraulic motor required in these operating phases. In operating phases with low demands on the hydraulic motor, in contrast, the control can set a lower desired system pressure which is nevertheless sufficient to provide the lower output torques required in these phases. In accordance with the invention, the system pressure can thus be adapted to the performance demands of the secondarily regulated drive system.

Since the pressure level can be lowered in operating phases with low performance demands, both displacement units work with larger displacement volumes and lower operating pressures so that the losses of the displacement units can be reduced during these phases. Equally, all the components are spared during the operation with the lower supply pressure instead of working at an unrequired high pressure level as in the prior art. The hydraulic drive system in accordance with the invention can nevertheless cope easily with high performance demands in phases with high performance demands by a change of the desired system pressure in dependence on an operating parameter of the hydraulic motor, e.g. on the required performance demand and/or torque demand on the hydraulic motor. A substantially better total efficiency hereby results over the working cycle with equal maximum output performances or output torques, whereby correspondingly lower fuel consumption and lower environmental pollution can also be achieved.

Further advantageously, the control in accordance with the invention sets the desired system pressure based on an operating parameter which is provided by the secondary regulation of the hydraulic motor and in particular based on the adjustment angle of the adjustable secondarily regulated hydraulic motor. A complicated control is hereby not necessary which would have to analyze the demands on the drive system independently of the secondary regulation of the hydraulic motor to set the desired system pressure. It is rather possible to make use directly of the regulation of the hydraulic motor anyway present which anyway takes account of the performance demands or torque demands on the hydraulic motor. Since the adjustment angle of the hydraulic motor corresponds to the output power provided by the hydraulic motor or to the output torque provided by the motor, a particularly simple control of the desired system pressure based on the adjustment angle of the hydraulic motor results. In this connection, the adjustment angle set via the secondary regulation of the hydraulic motor can itself be used for the setting of the desired system pressure. An embodiment of the present invention hereby results with an only slightly increased control effort and/or expense.

Further advantageously, the control in accordance with the invention sets the desired system pressure to at least two different pressure stages in this connection. A simple control of the hydraulic drive system in accordance with the invention in turn results in this respect by the use of different pressure stages between which the control changes.

Advantageously, the control changes from a first pressure stage to a second pressure stage when the operating parameter of the hydraulic motor reaches a specific value. It is thus e.g. possible to change from a normal pressure stage into a high pressure stage when the performance demand and/or the torque demand on the hydraulic motor exceed a specific value. The hydraulic drive system in accordance with the invention can thus also provide high performance demands due to the thus increased system pressure. If the performance demands, in contrast, again fall below a specific value, it is e.g. possible to change back to the normal pressure, whereby a better efficiency can be realized in phases having low performance demands.

It is naturally also possible in this connection to use more than two pressure stages for the adaptation to different performance demands, which would, however, in turn make the complexity of the system unnecessarily complicated for most demands.

The control in accordance with the invention advantageously changes from a normal pressure stage to a high pressure stage when the adjustment angle of the adjustable secondarily regulated hydraulic motor reaches a specific value. The system pressure is hereby maintained at a low normal pressure level on the part of the pressure regulated hydraulic pump with small performance demands on the secondarily regulated propulsion drive. If, however, the machine to be driven should be greatly accelerated or if it has to overcome high counter-forces (traction forces, friction forces, . . . ), the hydraulic motor will increase its displacement volume in accordance with the secondary regulation, i.e. it will continue to pivot out. If the hydraulic motor reaches a specific adjustment angle in this connection, e.g. the maximum adjustment angle, this counts in accordance with the invention as an indicator for the control that the supply pressure level provided by the pressure-regulated displacement pump is not sufficient to satisfy the performance demands of the output. At this operating point, the control in accordance with the invention therefore switches the desired system pressure, which is set for the pressure-regulated hydraulic pump, from the low normal pressure to a higher pressure level so that the hydraulic drive system in accordance with the invention also satisfies the high performance demands.

Further advantageously, the control changes in this connection from a high pressure stage to a normal pressure stage when the adjustment angle of the adjustable secondarily regulated hydraulic motor falls below a specific value, in particular the maximum adjustment angle in a displacement direction. If therefore the displacement volume of the hydraulic motor falls below a specific value, in particular the maximum adjustment angle, as a result of either the increased supply pressure or of a reduced demanded output torque, the control in accordance with the invention lowers the desired pressure setting of the pressure regulation of the hydraulic pump back to the lower supply level. It is naturally also possible in this connection that the adjustment angle at which a change is made from the high pressure stage to the normal pressure stage is somewhat smaller than the adjustment angle at which a change is made from the normal pressure stage to the high pressure stage so that a certain hysteresis of the circuit results which avoids an unnecessary switching between the pressure stages when the performance demands on the hydraulic motor are only slightly below or above the maximum output power possible with normal pressure.

Further advantageously, at least one transducer is provided in accordance with the invention which gives the control an indicator signal when the adjustment angle of the adjustable secondarily regulated hydraulic motor reaches a specific value, in particular the maximum adjustment angle in a displacement direction. Such a transducer in this connection makes possible a particularly simple and reliable control to change from one pressure stage into another pressure stage.

Further advantageously, in accordance with the invention, at least two transducers are provided, in particular for the maximum adjustment angle in both displacement directions. A switch-over of the pressure levels at maximum performance demands can thus be realized with respect to the acceleration or with respect to the braking torques with only two transducers.

Further advantageously, in accordance with the invention at least one high pressure store is provided which is connected or connectable to the hydraulic circuit of hydraulic pump and hydraulic motor. This high pressure store can receive hydraulic fluid when the hydraulic motor works e.g. as a pump and the energy thus stored is returned to the hydraulic system in phases in which the hydraulic motor again takes up power.

Further advantageously, in accordance with the invention, at least two high pressure stores are provided which are alternately connectable to the hydraulic circuit by the control. It is hereby possible to respond to the different desired pressure levels of the hydraulic system in accordance with the invention, with the pressure in the hydraulic stores not also having to be increased accordingly to increase the system pressure.

The high pressure stores advantageously have different pressure levels for this purpose and are connected to the hydraulic circuit by the control in dependence on the set desired system pressure. The actual system pressure can hereby be approximated fast to the desired system pressure in that the corresponding high pressure store is connected to the hydraulic circuit.

Further advantageously, in accordance with the invention, the control is made up of simple switching elements. It is possible without problem to switch to and fro between individual pressure stages by them without complex regulations being required for this purpose.

The hydraulic drive system in accordance with the invention is in this connection advantageously used as a hydrostatic transmission for the drive of a vehicle, in particular for the drive of a movable working machine, further advantageously for the drive of an earth-moving machine. With such a propulsion drive, the advantages in accordance with the invention result in a particular manner since corresponding work cycles with very different demands on the propulsion drive are present here.

Accordingly, the present invention furthermore comprises a vehicle, in particular a movable work machine, in particular an earth-moving machine, having a hydraulic drive system such as was described above. Such a vehicle obviously has the same advantages as were described further above, in particular the lower fuel consumption and the lower environmental pollution with unchanging high performance.

BRIEF DESCRIPTION OF THE DRAWINGS

The present invention will now be described in more detail with reference to drawings and embodiments. There are shown.

DESCRIPTION OF THE PREFERRED EMBODIMENTS

Figure 1:
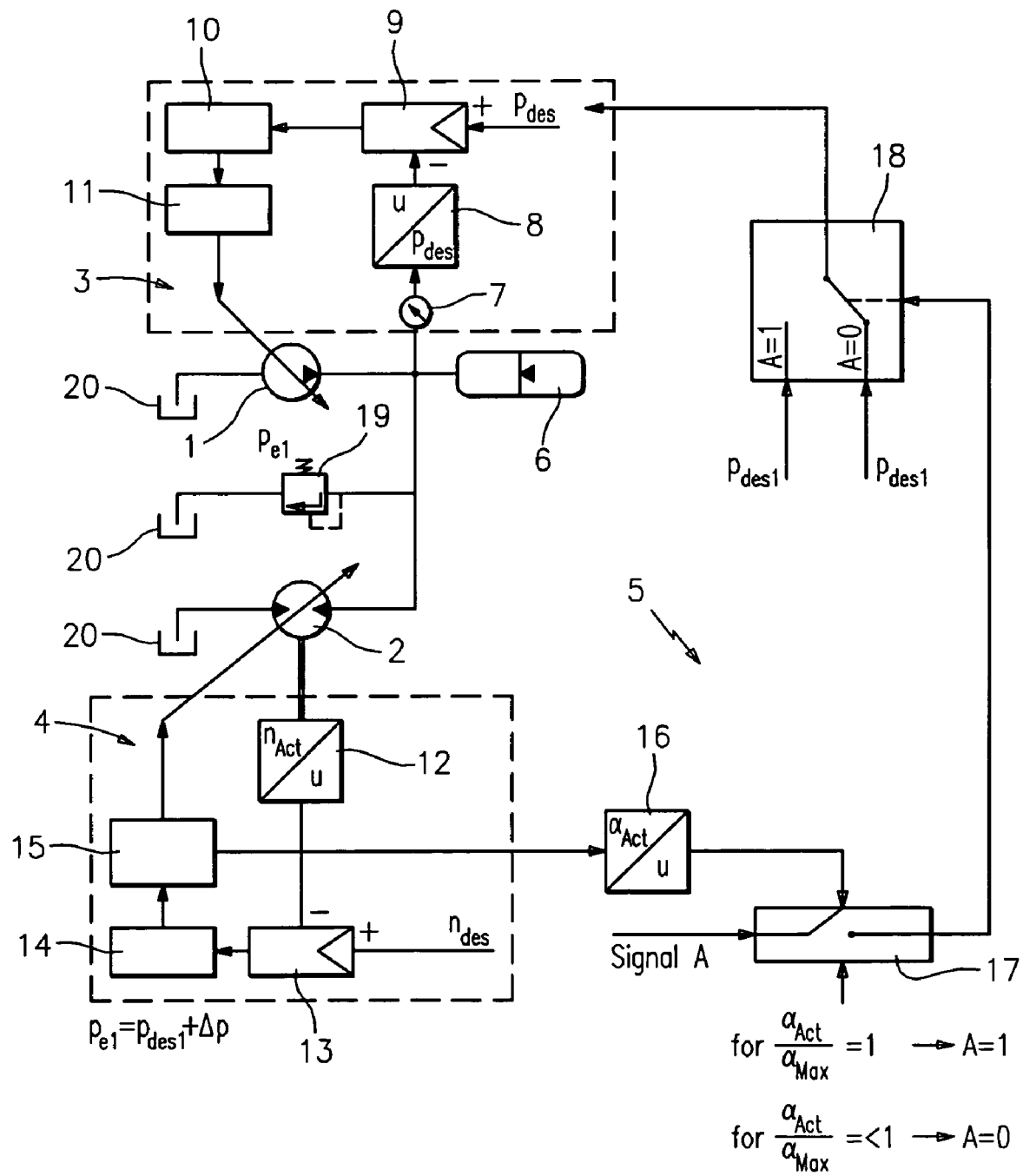
FIG. 1. a first embodiment of the hydraulic drive system in accordance with the invention, and FIG. 2. a second embodiment of the hydraulic drive system in accordance with the invention.

FIG. 1 shows the circuit diagram of a first embodiment of the secondarily regulated hydraulic drive system in accordance with the invention. The open hydraulic circuit is formed in this respect by the hydraulic variable delivery pump 1 as well as by the hydraulic variable capacity motor 2, with the hydraulic pump 1 pumping hydraulic fluid from the hydraulic reservoir 20 to the hydraulic motor 2 via which it flows back to the hydraulic reservoir 20 again. The hydraulic pump 1 is in this connection pressure-regulated via a regulation 5 while the hydraulic motor 2 is regulated via a regulation 4, that is, it is regulated in dependence on its speed, its torque and/or its rotational angle.

The hydraulic pump 1 is a variable delivery pump having a pumping direction which can be adjusted from 0 to a maximum pumping volume. The pressure regulation device 3 in this respect provides that the hydraulic pump 1 pumps exactly the oil volume flow from the reservoir into the performance network which maintains the system pressure $p_{Act}$ in the performance network constantly at the preset desired system pressure $p_{Des}$. For this purpose, a pressure sensor 7 is connected to the output of the hydraulic pump 1 which forwards the system pressure $p_{Act}$ to the regulator 9 via a converter 8. The regulator 9 receives the desired system pressure $p_{Des}$ as a further input signal. In dependence on the difference between the actual system pressure $p_{Act}$ and the desired system pressure $p_{Des}$, the regulator 9 controls the proportional valve 10 via which the setting cylinder 11 adjusts the pumping volume of the hydraulic pump 1. The actual system pressure $p_{Act}$ in the line network is regulated to the desired system pressure $p_{Des}$ via this regulation circuit of pressure sensor, regulator and actuator for the hydraulic pump 1.

The hydraulic motor 12 is a variable capacity motor which can be adjusted from a maximum negative displacement volume to a maximum positive displacement volume, that is, the hydraulic motor can pivot through completely. Either hydraulic fluid can hereby flow out of the line network into the reservoir 20 via the hydraulic motor 2, with the hydraulic motor 2 outputting an output torque to the apparatus to be driven. Conversely, the hydraulic motor 2 can also work as a hydraulic pump and pump hydraulic fluid from the hydraulic reservoir 20 into the line network and so brake the apparatus. In this connection, a high pressure store 6 which can store the hydraulic energy temporarily is connected to the line network of the hydraulic circuit. If the system pressure increases, for example in that the hydraulic motor works in pump operation, the high pressure store 6 receives oil volume and can return it to the line network at a later time.

The output torque of the hydraulic motor 2 which is advantageously made in axial piston construction is in this connection in proportional relationship with its set displacement volume and the applied actual system pressure $p_{Act}$. The secondary regulation 4 of the hydraulic motor 2 is designed as a speed regulation in this respect in the embodiment shown. It regulates the displacement volume of the hydraulic motor 2 exactly so that its output torque accelerates or decelerates the drivetrain of the apparatus to be driven to the speed desired by the operator or maintains it at the desired speed. Depending on the set displacement volume, the hydraulic motor removes the required volume flow from the line network for this purpose. If the speed parameter of the operator requires a deceleration of the drivetrain, the variable capacity motor changes its displacement direction and works in pump operation. The regulation device 4 for this purpose first includes a speed sensor 12 which passes the actual speed of the hydraulic motor 2 to the regulator 13 via a converter. The regulator 13 furthermore receives a desired speed parameter $n_{des}$ which corresponds to the output speed of the drivetrain desired by the operator. In accordance with the difference between the actual speed $n_{Act}$ and the desired speed $n_{Des}$, the regulator 13 then controls the proportional valve 14 which adjusts the displacement volume of the hydraulic motor 2 accordingly via the setting cylinder 15.

To achieve a wide performance range of the secondarily regulated hydraulic drive system in accordance with the invention with a high total efficiency, a control 5 is now provided in accordance with the invention which sets the desired system pressure $p_{Des}$ in dependence on an operating parameter of the hydraulic motor 2 during the operation of the hydraulic drive system. To be able to take account of the performance demand and/or the torque demand on the hydraulic motor 2 in a simple manner, the adjustment angle $\alpha_{Act}$ of the hydraulic motor 2 is used in this connection for the setting of the desired system pressure $p_{Des}$. This adjustment angle $\alpha_{Act}$ of the hydraulic motor 2 can in this connection be determined without problem via the setting cylinder path of the setting cylinder 15 which sets the displacement volume of the hydraulic motor 2.

For the control 5 in accordance with the invention at which a change is made between a normal pressure stage with a desired pressure $p_{Des2}$ to a high pressure stage with a desired pressure $p_{Des1}$ when the adjustment angle $\alpha_{Act}$ of the hydraulic motor 2 has reached the maximum adjustment angle $\alpha_{Max}$ in one of the two pumping directions, two transducers 16 are sufficient which give the control an indicator signal when the actual adjustment angle $\alpha_{Act}$ of the hydraulic motor 2 has reached the maximum adjustment angle $\alpha_{Max}$ in one of the two displacement directions, that is, when the variable capacity motor is working either with a maximum negative displacement volume or with a maximum positive displacement volume. These indicator signals in this respect generate a switch-over signal in the switching element 17 which is forwarded to the pressure switching element 18. If therefore the actual adjustment angle $\alpha_{Act}$ of the hydraulic motor 2 is less than the maximum adjustment angle $\alpha_{Max}$, the switch-over signal A is not applied to the pressure switching element 18, that is, A=0. If, in contrast, the switching element 17 receives an indicator signal from the transducers 16 that the actual adjustment angle $\alpha_{Act}$ of the hydraulic motor 2 is equal to the maximum adjustment angle $\alpha_{Max}$, a switch-over signal A is applied to the pressure switching element 18, that is, A=1.

Depending on whether a switch-over signal is applied to the pressure switching element 18 or not, that is, on whether A=1 or A=0, the pressure switching element 18 sets a desired system pressure $p_{Des1}$ or $p_{des2}$ for the regulator 9 of the pressure regulation 3 of the hydraulic pump 1. A high desired system pressure $p_{Des1}$ is hereby set for the regulator 9 when the switch-over signal is A=1, that is, when the actual adjustment angle of the hydraulic motor 2 corresponds to the maximum adjustment angle $\alpha_{Max}$. If, in contrast, no switch-over signal is applied to the pressure switching element 18, since the actual adjustment angle $\alpha_{Act}$ is less than the maximum adjustment angle $\alpha_{Max}$, the control 5 sets a desired system pressure $p_{Des2}$ for the regulator 9 of the pressure regulation 3 which corresponds to a normal system pressure at low performance demands and is lower than the desired system pressure $p_{Des1}$.

Furthermore, a pressure regulation valve 19 is connected to the hydraulic circuit and blocks below a pressure $p_{e1}=p_{Des1}+\delta p$ and connects the line network to the hydraulic reservoir 20 above this pressure. It is hereby ensured that the maximum system pressure can exceed the higher desired system pressure $p_{Des1}$ by a maximum of $\delta p$.

The secondarily regulated hydraulic drive system can now be used e.g. as propulsion drive of a vehicle such as of an earth-moving machine. The hydrostatic propulsion drive in accordance with the invention can thus cover a wide performance spectrum, that is, it can satisfy both small performance demands (low speeds and accelerations at low drive torques) and large performance demands (high speeds and accelerations at high drive torques), with a good efficiency resulting both for small and large performance demands due to the switch-over in accordance with the invention of the desired system pressure. In this respect, the propulsion drive for a typical travel cycle requires a large output torque during the start-up phase to accelerate the machine to the desired speed. The propulsion drive during travel at the reached speed, in contrast, still only requires a low output torque to maintain the machine at the speed.

Since the output torque of the secondarily regulated hydraulic motor 2 is dependent on the product of its displacement volume and the system pressure $p_{Act}$, the secondarily regulated drive needs a high system pressure $p_{Act}$ during high loads, e.g. during a start-up phase, while it only requires a low system pressure $p_{Act}$ during low performance demands e.g. during travel at a constant speed. The supply pressure switch-over in accordance with the invention realizes this adaptation of the system pressure $p_{Act}$ to the performance demand of the secondarily regulated drive in this respect by the switch-over from a lower desired system pressure $p_{Des2}$ to a higher desired system pressure $p_{Des1}$ when the adjustment angle of the hydraulic motor 2 reaches a specific value, in this case the maximum adjustment angle $\alpha_{Max}$.

If only small performance demands are made on the secondarily regulated drive, the system pressure $p_{Act}$ is maintained by the pressure-regulated hydraulic pump 1 at the low normal system pressure $p_{Des1}$ which is set for the pressure regulation device 3 as the desired system pressure $p_{Des}$. Since the performance demands on the hydraulic motor are low in these phases, the motor works at adjustment angles $\alpha_{Act}$, which are smaller than the maximum adjustment angle $\alpha_{Max}$. If, however, the machine to be driven should be accelerated greatly or if it must overcome high counter-forces such as traction forces or friction forces, the hydraulic motor will increase its displacement volume in accordance with the speed regulation 4, that is, it will increase the adjustment angle $\alpha_{Act}$. If the hydraulic motor 2 reaches its maximum displacement volume and thus its maximum adjustment angle $\alpha_{Max}$, this is seen as an indicator for the fact that the system pressure level provided by the pressure-regulated hydraulic pump 1 is not sufficient to satisfy the performance demands of the output. At this operating point with a fully outwardly pivoted hydraulic motor 2, the control 5 will switch over the desired system pressure $p_{Des}$, which is set for the pressure regulation 3, from the lower desired system pressure $p_{Des2}$ to the higher desired system pressure $p_{Des1}$. As soon as the hydraulic motor 2 reduces its displacement volume again as a result of the increased system pressure or of a lower demanded output torque, that is, pivots back and thus has a lower adjustment angle $\alpha_{Act}$, the control 5 lowers the desired pressure setting for the pressure regulation 3 of the hydraulic pump 1 back to the lower supply pressure level $p_{Des2}$. In this connection, a specific hysteresis can also be provided with the control 5 so that a switch-over is not made immediately again from the higher to the lower desired pressure setting when the hydraulic pump 2 pivots back from the maximum adjustment angle $\alpha_{Max}$, but only when a smaller angle $\alpha_{Max}-\delta$ is fallen below.

In the first embodiment shown in FIG. 1, a high pressure store 6 is connected to the hydraulic circuit of hydraulic pump 1 and hydraulic motor 2 which is at this lower system pressure during operating phases with small performance demands and thus with a low system pressure $p_{Act}=p_{Des2}$. If the control 5 now switches to a higher desired system pressure $p_{Des1}$, the high pressure store 6 must also be brought to the higher pressure level by the hydraulic pump 1 to bring the line network to the higher system pressure $p_{Act}=p_{Des1}$. For this purpose, hydraulic fluid must first also be pumped into the hydraulic store 6 so that a specific delay results in the provision of the higher system pressure.

Figure 2:
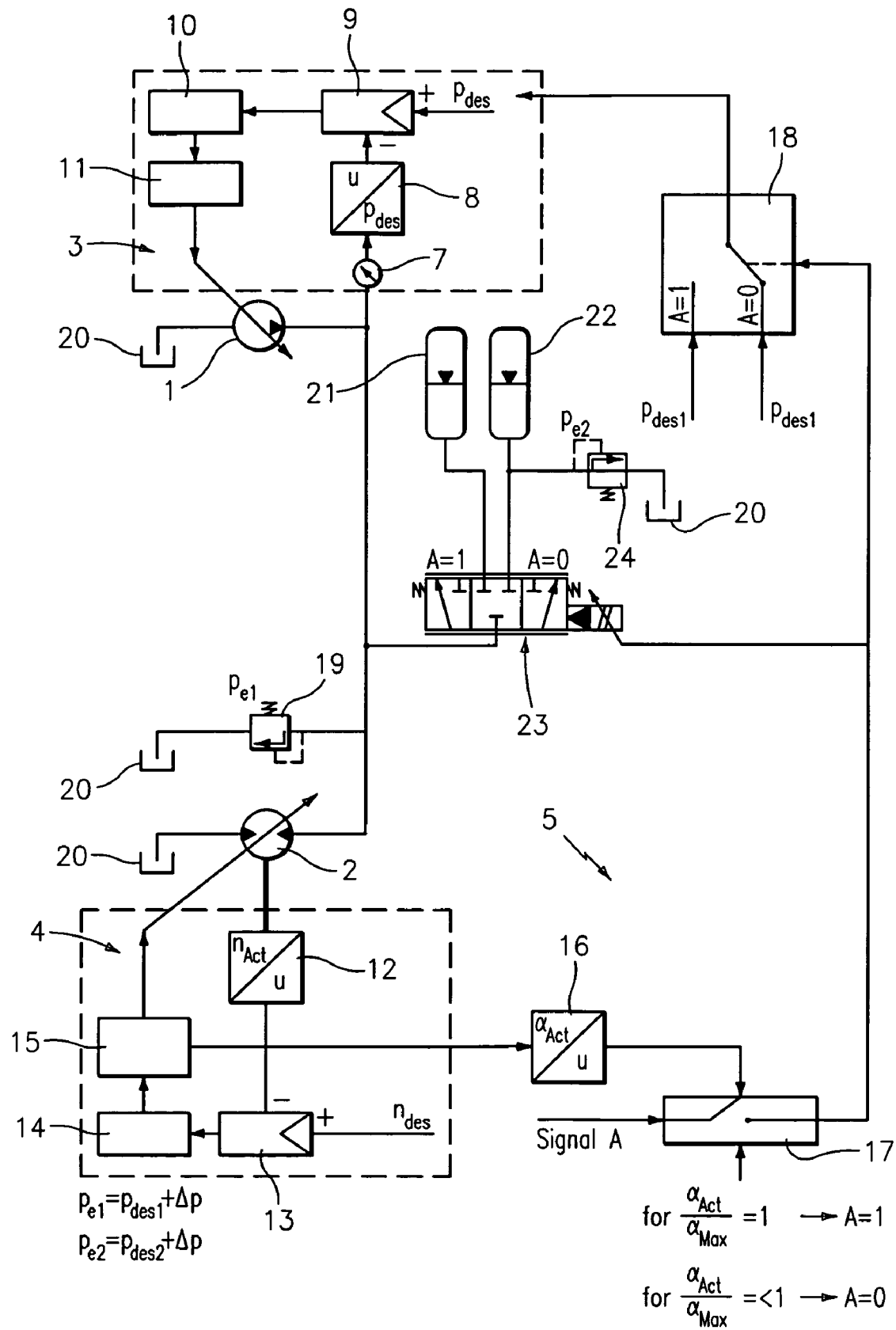

A second embodiment of the hydraulic drive system in accordance with the invention is now shown in FIG. 2 which only differs from the drive system shown in FIG. 1 with respect to the high pressure store. Reference is therefore made to the description with respect to FIG. 1 with respect to all other components.

In the embodiment shown in FIG. 2, two high pressure stores 21 and 22 are now provided which can be connected alternately via the switching valve 23 to the hydraulic circuit of hydraulic pump 1 and hydraulic motor 2. The switching valve 23 is in this connection likewise controlled by the control 5 in that the switch-over signal A is applied to the switching valve 23 and controls it. For A=0, that is, when no switch-over signal is applied since the adjustment angle $\alpha_{Act}$ is less than the maximum adjustment angle $\alpha_{Max}$, the switching valve 23 connects the hydraulic circuit to the high pressure store 22 which accordingly has the lower normal pressure $p_{Des2}$. In this respect, a pressure regulation valve 24 is connected to the hydraulic line between the high pressure store 22 and the switch-over valve 23 which blocks up to a pressure $p_{e2}=p_{Des2}+\delta p$ and connects the high pressure store 22 to the hydraulic reservoir 20 above this pressure. It is hereby ensured that the pressure in the high pressure store 22 exceeds the lower normal system pressure $p_{Des2}$ by a maximum of $\delta p$. If the high pressure store 22 is connected to the line network, the same thus also applies to the line network itself.

If a switch-over signal A=1 is generated because the adjustment angle of the hydraulic motor 2 reaches the maximum adjustment angle $\alpha_{Max}$, the switch-over valve 23 switches over so that the high pressure store 22 is cut off from the line network and the high pressure store 21 is connected to the line network. At the same time, the desired pressure value is switched over to the higher desired system pressure $p_{Des1}$. The high pressure store 21 in this respect already has the higher system pressure $P_{Des1}$ from previous switch-over cycles so that the pressure increase in the line network takes place considerably faster.

If the hydraulic motor 2 pivots back again so that the desired system pressure is again set to the lower pressure $p_{Des2}$, the switching valve 23 also switches back again and connects the high pressure store 22 with the lower pressure level to the line network. A very fast switch-over between the pressure levels in the line network thus results by the two high-pressure stores 21 and 22 at different pressure levels $p_{Des1}$ and $p_{Des2}$ without the high pressure store in each case having to be filled or emptied for this purpose. A faster response of the control in accordance with the invention as well as a higher efficiency hereby in turn results.

In accordance with the invention, a reduction in the losses of the displacement units results due to the lowering in accordance with the invention of the pressure level with a smaller power demand since said displacement units would have high losses in principle (in particular when it is a case of axial piston units) at working points with small displacement volumes and high operating pressures. Due to the lower system pressure at small performance demands, the displacement units, in contrast, work with lower pressures and correspondingly higher displacement volumes and thus higher adjustment angles in this range so that a substantially improved total efficiency results. Lower fuel consumption and lower environmental pollution hereby results.

It is moreover possible in accordance with the invention in this respect to adapt the drive to specific performance demands, e.g. in that selection stages for Eco, Power, Comfort or similar are set by a pre-selection of the operator. In this respect the control 5, which sets the desired pressures, can be changed accordingly in its switching characteristics by this pre-selection of the operator. It is thus conceivable to set the maximum desired system pressure constantly for the Power mode and only to provide the pressure switch-over in accordance with the invention in a Comfort mode or in an Eco mode. It is equally conceivable to provide different adjustment angles $\alpha_{max1, 2, \ldots}$ at which a switch is made from a low level to a high pressure level depending on the operating mode. It is furthermore conceivable, in dependence on the operating mode, to set different desired pressure levels $p_{Des1, 2, Power}, p_{Des1, 2, eco}$, etc. which are preset for the pressure regulation device in dependence on the operating mode.

In accordance with the invention, in addition to the increase in the total efficiency, a reduced load on the components also results during operation at low supply pressure without performance compromises hereby arising since the drive can nevertheless cope with high performance demands due to the switch-over to the high supply pressure. The embodiment in accordance with the invention as a switch-over moreover requires a hardly increased effort and/or cost since the majority of all elements are anyway present.

In accordance with the invention, only the control 5 has to be added here which can be realized with the help of simple transducers and switching elements. In particular no complicated regulation has to be provided separately for the control 5 since it can make use of an operating parameter of the hydraulic motor which is already provided by the secondary regulation 4 of the hydraulic motor 2.

In accordance with the invention, an equally cost-favorable and comfortable solution thus results which substantially improves the total efficiency of the hydraulic system.

The invention claimed is:

1. A hydraulic drive system comprising:
a pressure-regulated hydraulic pump, the pressure-regulated hydraulic pump effective to provide a system pressure;
a secondarily regulated hydraulic motor in communication with the pressure-regulated hydraulic pump; and
a control in communication with the pressure-regulated hydraulic pump and the secondarily regulated hydraulic motor, the control effective to monitor at least one operating parameter of the hydraulic motor, increase the system pressure for the pressure-regulated hydraulic pump when the at least one operating parameter indicates a need for increased system pressure and decrease the system pressure for the pressure-regulated hydraulic pump when the at least one operating parameter indicates a need for decreased system pressure, set the desired system pressure to at least two different pressure stages, and to change from a normal pressure stage to a high pressure stage when the adjustment angle of the adjustable secondarily regulated hydraulic motor reaches a maximum adjustment angle in a displacement direction.

2. A hydraulic drive system as recited in claim 1, wherein the control is effective to set the desired system pressure in dependence on the performance demands and/or torque demands on the secondarily regulated hydraulic motor.

3. A hydraulic drive system as recited in claim 2, wherein the control is effective to set the desired system pressure based on an adjustment angle of the adjustable secondarily regulated hydraulic motor.

4. A hydraulic drive system as recited in claim 3, wherein the control is effective to set the desired system pressure to at least two different pressure stages.

5. A hydraulic drive system as recited in claim 4, wherein the control is effective to change from a first pressure stage to a second pressure stage when the operating parameter reaches a specific value.

6. A hydraulic drive system as recited in claim 2, wherein the control is effective to set the desired system pressure to at least two different pressure stages.

7. A hydraulic drive system as recited in claim 1, wherein the control is effective to set the desired system pressure based on an adjustment angle of the secondarily regulated hydraulic motor.

8. A hydraulic drive system as recited in claim 7, wherein the control is effective to set the desired system pressure to at least two different pressure stages.

9. A hydraulic drive system as recited in claim 1, wherein the control is effective to change from a first pressure stage to a second pressure stage when the operating parameter reaches a specific value.

10. A hydraulic drive system as recited in claim 1, wherein the control is effective to change from a high pressure stage to a normal pressure stage when the adjustment angle of the adjustable secondarily regulated hydraulic motor falls below a specific value.

11. A hydraulic drive system as recited in claim 1, further comprising a transducer effective to provide the control an indicator signal when the adjustment angle of the adjustable secondarily regulated hydraulic motor reaches a maximum adjustment angle in a displacement direction.

12. A hydraulic drive system as recited in claim 11, wherein at least two transducers are provided respectively for the maximum adjustment angle in both displacement directions.

13. A hydraulic drive system as recited in claim 1 further comprising at least one high pressure store connected or connectable to the hydraulic circuit of the hydraulic pump and the hydraulic motor.

14. A hydraulic drive system as recited in claim 1 wherein the control is made up of switching elements.

15. A hydraulic drive system as recited in claim 1 as a hydrostatic transmission for the drive of a movable work machine.

16. A movable work machine, having a hydraulic drive system as recited in claim 1.

17. A hydraulic drive system comprising:
a pressure-regulated hydraulic pump for the provision of a system pressure; and
a secondarily regulated hydraulic motor, wherein
a control is provided which sets the desired system pressure during operation in dependence on an operating parameter of the hydraulic motor; and further comprising
at least one high pressure store connected or connectable to the hydraulic circuit of the hydraulic pump and the hydraulic motor; and
at least two high pressure stores alternately connectable to the hydraulic circuit by the control.

18. A hydraulic drive system as recited in claim 17, wherein the high pressure stores have different pressure levels and are connected to the hydraulic circuit by the control in dependence on the set desired system pressure.

19. A hydraulic drive system comprising:
a pressure-regulated hydraulic pump, the pressure-regulated hydraulic pump effective to provide a system pressure;
a secondarily regulated hydraulic motor in communication with the pressure-regulated hydraulic pump; and
a control in communication with the pressure-regulated hydraulic pump and the secondarily regulated hydraulic motor, the control effective to monitor at least one operating parameter of the hydraulic motor, increase the system pressure for the pressure-regulated hydraulic pump when the at least one operating parameter indicates a need for increased system pressure and decrease the system pressure for the pressure-regulated hydraulic pump when the at least one operating parameter indicates a need for decreased system pressure, set the desired system pressure to at least two different pressure stages, and change from a high pressure stage to a normal pressure stage when the adjustment angle of the adjustable secondarily regulated hydraulic motor falls below a specific value.

* * * * *